United States Patent
Zhang et al.

(10) Patent No.: US 8,542,760 B2
(45) Date of Patent: Sep. 24, 2013

(54) FULL-RATE DISTRIBUTED SPACE-TIME CODES FOR COOPERATIVE COMMUNICATIONS

(75) Inventors: Wei Zhang, Hong Kong (CN); Khaled Ben Letaief, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 1193 days.

(21) Appl. No.: 11/941,293

(22) Filed: Nov. 16, 2007

(65) Prior Publication Data

US 2009/0129496 A1 May 21, 2009

(51) Int. Cl.
*H04L 5/12* (2006.01)

(52) U.S. Cl.
USPC ........... 375/262; 375/259; 375/260; 375/261; 375/341; 704/242

(58) Field of Classification Search
USPC .......................... 375/259–262, 341; 704/242
See application file for complete search history.

(56) References Cited

U.S. PATENT DOCUMENTS

| | | | | |
|---|---|---|---|---|
| 2004/0266339 | A1* | 12/2004 | Larsson | 455/7 |
| 2005/0053172 | A1* | 3/2005 | Heikkila | 375/333 |
| 2008/0045212 | A1* | 2/2008 | Kim et al. | 455/435.1 |
| 2008/0317168 | A1* | 12/2008 | Yang et al. | 375/298 |

OTHER PUBLICATIONS

A. Sendonaris, E. Erkip and B. Aazhang, "User cooperation diversity—Part I: system description," IEEE Trans. Commun., vol. 51, pp. 1927-1938, Nov. 2003.
J. N. Laneman and G. W. Wornell, "Distributed space-time coded protocols for exploiting cooperative diversity in wireless networks," IEEE Trans. Inf. Theory, vol. 49, pp. 2415-2425, Oct. 2003.
Y. Jing and B. Hassibi, "Distributed space-time coding in wireless relay networks," IEEE Trans. Wireless Commun., vol. 5, pp. 3524-3536, Dec. 2006.
F. Oggler and B. Hassibi, "An algebraic family of distributed space-time codes for wireless relay networks," in Proc. IEEE ISIT, Seattle, USA, Jul. 9-14, 2006, pp. 538-541.
W. Zhang, Y. Li, X.-G. Xia, P. C. Ching, and K. B. Letaief, "Distributed space-frequency coding for cooperative diversity in broadband wireless ad hoc networks," IEEE Trans. Wireless Commun., to appear, Mar. 2008.
R. U. Nabar, H. Bolcskei, and F. W. Kneubuhler, "Fading relay channels: performance limits and space-time signal design," IEEE J. Sel. Areas Commun. vol. 22, pp. 1099-1109, Aug. 2004.

(Continued)

*Primary Examiner* — Zewdu Kassa
(74) *Attorney, Agent, or Firm* — Turocy & Watson, LLP

(57) ABSTRACT

A full-rate distributed space-time (ST) code design is provided for amplify-and-forward cooperative wireless channels. A signal space diversity technique is employed at the source node and a unique signature vector at each relay node. The distributed space-time (ST) codes can achieve full cooperative diversity and full rate. The achievable diversity gain is M+1, where M is the number of relay nodes. Optimal power allocation can be used to maximize the coding gain under a total power constraint.

22 Claims, 12 Drawing Sheets

(56) References Cited

OTHER PUBLICATIONS

K. Azarian, H. E. Gamal, and P. Schniter, "On the achievable diversity-multiplexing tradeoff in half-duplex cooperative channels," IEEE Trans. Inf. Theory, vol. 51, pp. 4152-4172, Dec. 2005.

S. Yang and J.-C. Belfiore, "On slotted amplify-and-forward cooperative diversity schemes," in Proc. IEEE ISIT, Seattle, USA, Jul. 9-14, 2006, pp. 2446-2450.

S. Yang and J.-C. Belfiore, "Optimal space-time codes for the MIMO amplify-and-forward cooperative channel," IEEE Trans. Inf. Theory, vol. 53, No. 2, pp. 647-663, Feb. 2007.

A. Murugan, K. Azarian and H. El Gamal, "Cooperative lattice coding and decoding," IEEE J. Sel. Areas Commun., vol. 25, No. 2, pp. 268-279, Feb. 2007.

X. Giraud, E. Boutillon, and J. C. Belfiore, "Algebraic tools to build modulation schemes for fading channels," IEEE Trans. Inf. Theory, vol. 43, pp. 938-952, May 1997.

J. Boutros and E. Viterbo, "Signal space diversity: a power and bandwidth efficient diversity technique for the Rayleigh fading channel," IEEE Trans. Inf. Theory, vol. 44, pp. 1453-1467, Jul. 1998.

E. Viterbo and J. Boutros, "A universal lattice code decoder for fading channels," IEEE Trans. Inf. Theory, vol. 45, pp. 1639-1642, Jul. 1999.

\* cited by examiner

US 8,542,760 B2

FULL-RATE DISTRIBUTED SPACE-TIME CODES FOR COOPERATIVE COMMUNICATIONS

TECHNICAL FIELD

The subject disclosure relates generally to wireless communications systems, and more particularly to space-time codes for cooperative wireless communications.

BACKGROUND OF THE INVENTION

Cooperative diversity has recently received wide recognition as a simple way to improve system error rate performance and capacity by forming virtual antenna arrays. For amplify-and-forward (AF) cooperative or relay networks, a number of distributed space-time (ST) coding schemes have been developed. Most of these coding schemes can achieve the maximum cooperative diversity gain in cooperative networks but at the cost of reduced symbol rate.

A non-orthogonal AF (NAF) scheme was proposed by allowing the source to continue transmission over the whole duration of the cooperation frame while the cooperative partner listens and relays. The NAF scheme was later proved to achieve the optimal diversity-multiplexing tradeoff (DMT) for the single-relay scenario. However, it is desirable to achieve optimal diversity multiplexing for multiple relays.

For the general case of arbitrary number of relay nodes, the best known DMT has been recently presented with a so-called naive slotted AF cooperative scheme. To realize a high symbol rate while guaranteeing full diversity, a few coding schemes were proposed. Based on one-by-one relay transmission, some existing optimal ST codes were applied to half-duplex NAF channels. However, one-by one relay transmissions reduces the symbol rate that can be transmitted.

The above-described deficiencies of cooperative wireless network communications are merely intended to provide an overview of some of the problems of today's cooperative wireless networks, and are not intended to be exhaustive. Other problems with the state of the art may become further apparent upon review of the description of various non-limiting embodiments that follows.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A full-rate cooperative diversity scheme for half-duplex NAF wireless channels is provided. Unlike relay transmission schemes based on multiple cooperation frames and round-robin relaying, various embodiments employ a block transmission via one cooperation frame for an arbitrary number of relay nodes. In particular, the relay nodes do not need to take turns to work in a predesigned order but operate simultaneously. Thus, cooperative transmission is simplified. In order to implement this block transmission, a distributed space time (ST) code design employs a signal space diversity technique at the source node and multiplies a unique signature vector at each relay node. The distributed ST codes can achieve full diversity and a full rate of 1. Moreover, an optimal power allocation can be used to maximize coding gain.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
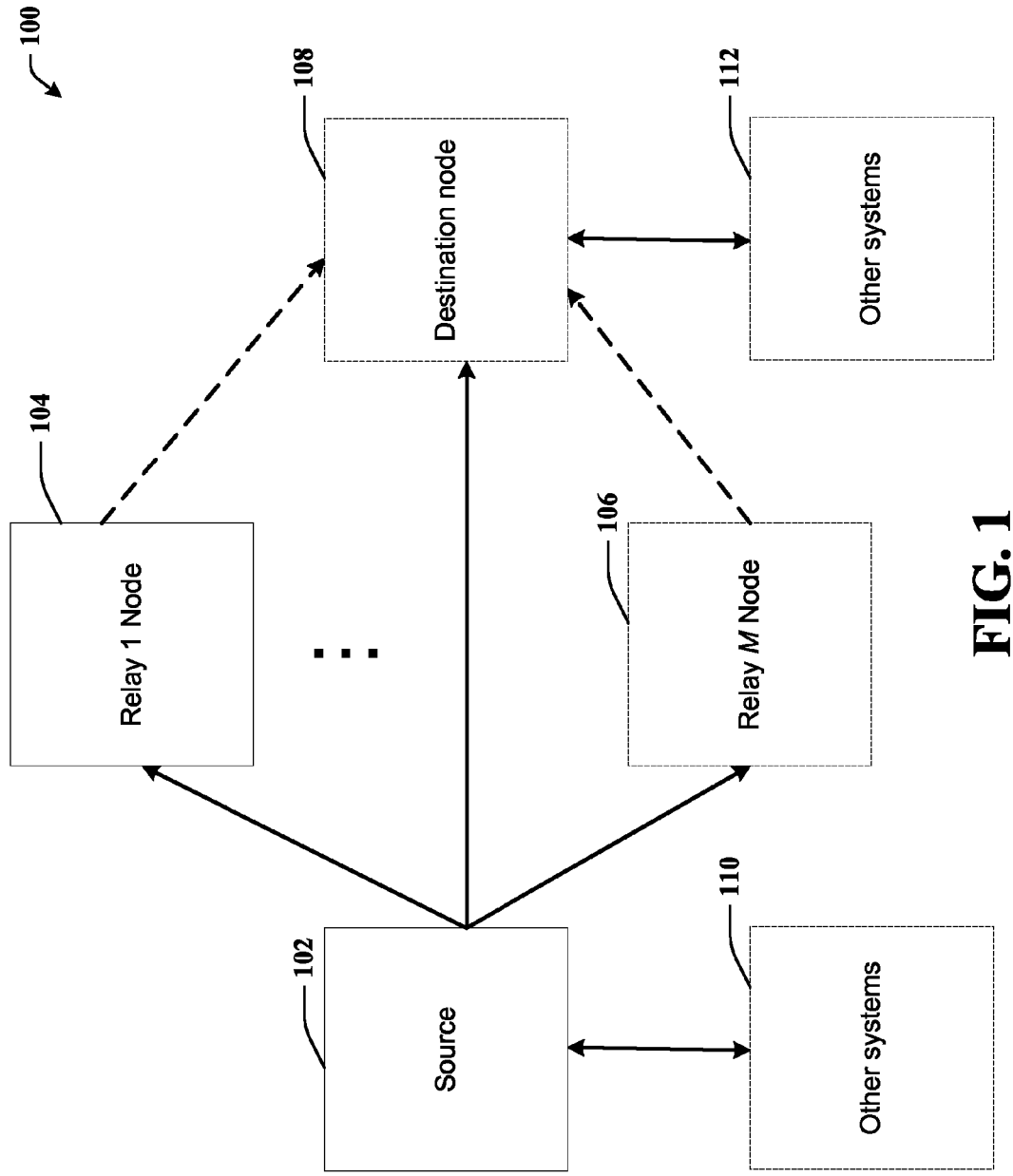
FIG. 1 is a block diagram of an exemplary cooperative wireless communication network in which the aspects can be implemented.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Referring to FIG. 1, an exemplary cooperative network environment suitable for implementing aspects described herein is shown. One will appreciate that the block diagram is not to scale and that the various nodes can be arranged in space so that they are communicatively coupled together.

The network comprises a source node 102, one or more relay nodes (104 and 106) and a destination node 108. For the sake of clarity, nodes are described herein as being of a particular type: a source node, a relay node, or a destination node. However, one skilled in the art will appreciate that a node can act as any of the types of nodes depend on the transmission that is currently occurring on the network. The source node 104 is the source of the data transmission and transmits data to the relay nodes (104, 106), as well as the destination node 108. In at least some embodiments, the source 102 is connected to other systems 110 (e.g., a LAN, the Internet, business systems) and receives data to transmit from there other systems. The one or more relay nodes 104 and 106 amplify and forward signals from the source node 102 to the destination node 108 The destination node can also be connected to other system 112 (e.g., a LAN, the Internet, or business systems).

One will appreciate that a cooperative wireless network can have one or more nodes that are not involved in a transmission of a block of data. For the sake of clarity, these nodes are not shown and described herein even though they be present in a cooperative network implementing aspects described herein.

Figure 2:
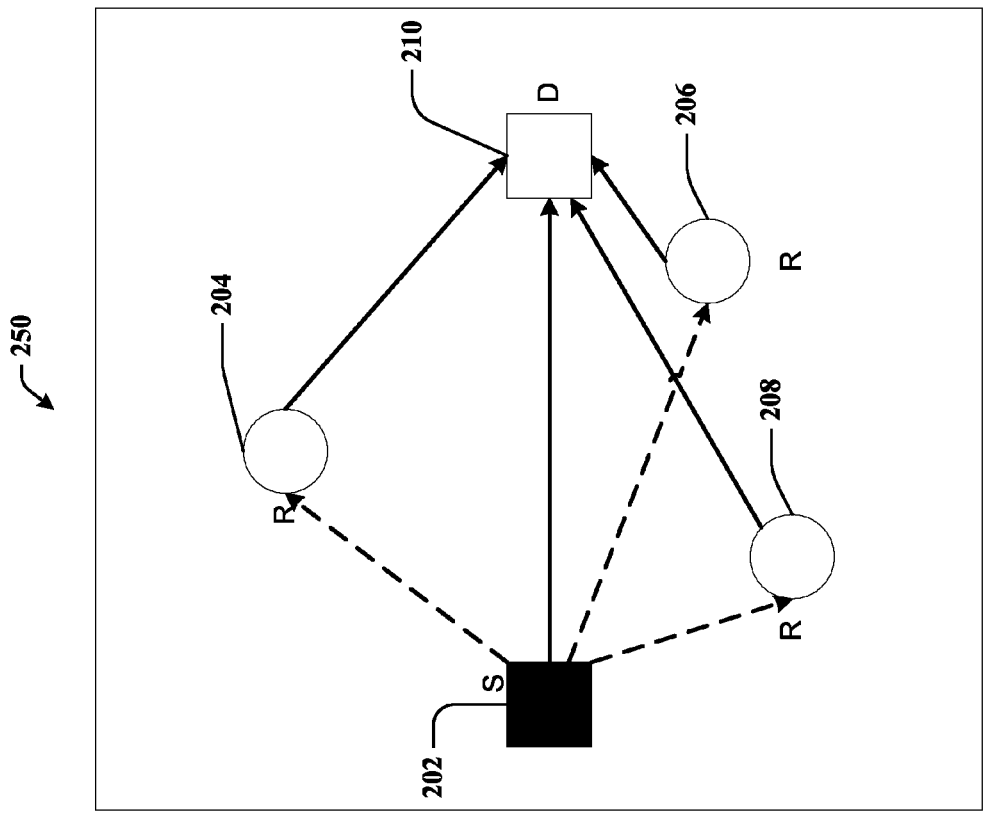
FIG. 2 is a diagram of transmissions in a cooperative wireless communication according to one aspect.
Figure 2:
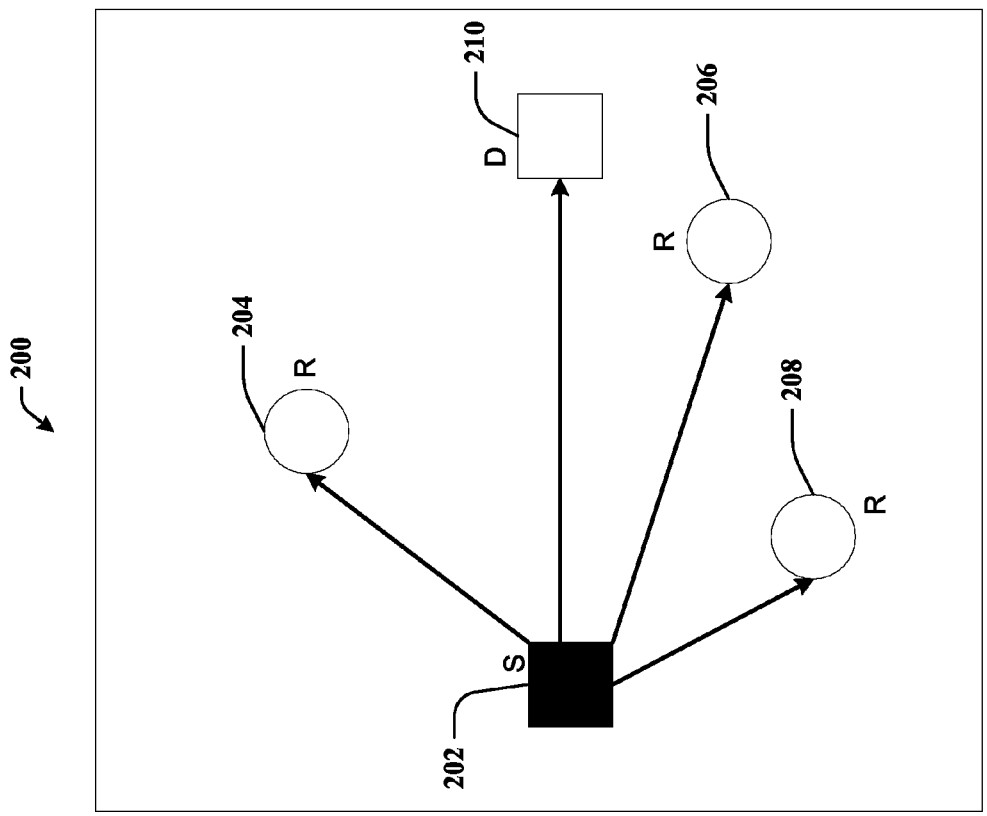

Referring to FIG. 2, a cooperative wireless network comprises an information source node S 202, M relay nodes (204, 206, 208) $R_i(i=1, \ldots, M)$ and a destination node D 210. Although only a few relay nodes are shown for the purpose of clarity, one will appreciate that there can be any number of relay nodes. The nodes can be equipped with a single antenna and can operate in half-duplex mode. In a first time slot 200, S 202 broadcasts information to all other nodes (204, 206, 208, 210) including the destination node D 210. In a second time slot 250, S 202 continues the transmission to D while some or all of the relay nodes (204, 206, 208) simultaneously send the signals received in the previous time slot to D 210. In addition, in at least some scenarios, the data transmitted by S 202 in the second time slot is transmitted to the relay nodes for relaying at a third time slot (not shown). The channels S→$R_i$, $R_i$→D and S→D are assumed to experience flat fading and the complex channel gains are denoted by $f_i$, $g_i$ and h, respectively. Without loss of generality, the additive white Gaussian noise (AWGN) of all the channels is assumed to have an equal variance $N_0$ and the channels $f_i$, $g_i$, and h are assumed to be perfectly known at the receiver only.

Figure 3:
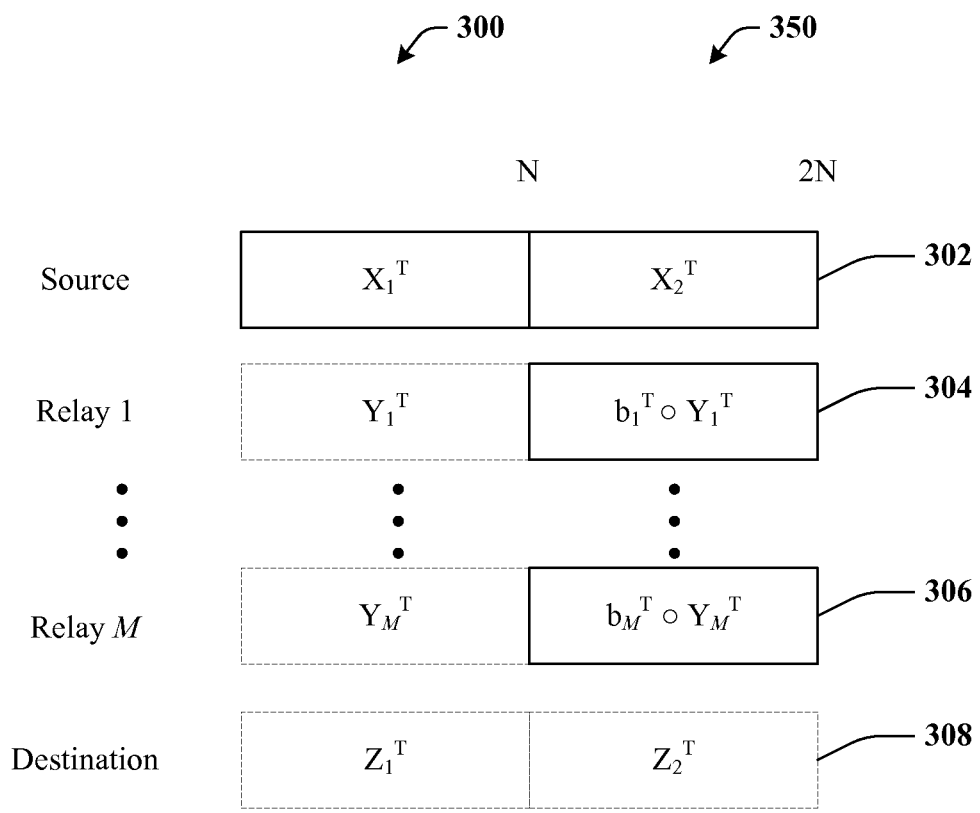
FIG. 3 illustrates an example non-orthogonal amplify and forward protocol with block transmission in one cooperative frame according to one aspect.

Referring to FIG. 3, one cooperation frame according to one aspect is illustrated. The solid lines refer to a signal being transmitted whereas dotted lines indicate the signal received. At the source node, a signal vector S of 2N information symbols is first encoded as a codeword X of length 2N. Let $X=[X_1^T X_2^T]^T$, where $X_1$ and $X_2$ are both of length N column vectors and the superscript $T$ denotes a transpose operation. $X_1$ and $X_2$ are sent from the source at the first time slot 300 and the second time slot 350, respectively. In each time slot, N symbol intervals are transmitted.

In the first time slot, the received signals at the ith relay node (e.g., Relay 1 304 and Relay M 306) and the destination node 308 are given by, $$Y_i = \sqrt{P_1} f_i X_1 + N_i \quad \text{(Equation 1)}$$

$$Z_1 = \sqrt{P_1} h X_1 + W_1 \quad \text{(Equation 2)}$$

respectively, where $Y_i$ and $Z_1$ are both column vectors of length-N, $P_1$ denotes the transmit power of the source node, $N_i$ and $W_1$ are both zero-mean complex Gaussian noise vectors with covariance matrix $N_0 I_N$. $I_N$ denotes the N×N identity matrix. At the ith relay node, the received signal vector $Y_i$ is scaled by $\alpha$ and component-wisely multiplied with a unique signature vector $b_i$ into $$A_i = \alpha \cdot (b_i \circ Y_i), \quad \text{(Equation 3)}$$

where $A_i$ is the length-N column vector, $\circ$ denotes a component-wise product (e.g., Hadamard product), $b_i$ is the signature vector of length N, and $\alpha$ denotes the power scaling factor to ensure that the average transmit power of any relay node is $P_2$. $\alpha$ can be calculated using $$\alpha = \sqrt{\frac{P_2}{N_0 + P_1}}.$$

In the second time slot, the scaled signal $A_i$ is sent to the destination node from all relay nodes simultaneously. Meanwhile, the signal $X_2$ is sent from the source node to D. Hence, the received signal at the destination node is $$Z_2 = \sqrt{P_3} h X_2 + \sum_{i=1}^{M} g_i A_i + W_2, \quad \text{(Equation 4)}$$

where $Z_2$ is the vector of length-N, $P_3$ denotes the transmit power of the source node in the second time slot of each frame and $W_2$ is a zero-mean complex Gaussian noise vector with covariance matrix $N_0 I_N$. By substituting Equation 3 and Equation 1 into 4, $$Z_2 = \sqrt{P_3} h X_2 + \alpha \sqrt{P_1} \sum_{i=1}^{M} f_i g_i (b_i \cdot X_1) + \tilde{W}_2, \quad \text{(Equation 5)}$$

where $$\tilde{W}_2 = \alpha \sum_{i=1}^{M} g_i (b_i \circ N_i) + W_2.$$

For a large value of M, $\sum_{i=1}^{M} |g_i|^2 \approx M$ with a high probability. As a result, $E[\tilde{W}_2 \tilde{W}_2^H] \approx N_0(1+M\alpha^2) I_N$ where the superscript $H$ denotes the complex transpose conjugate and $E[\cdot]$ represents the expectation operation.

At the destination node, $Z_1$ in Equation 2 and $Z_2$ in Equation 5 are further normalized so that the noise terms have zero-mean and unit variance. The normalized signals are then given by $$\tilde{Z}_1 = \sqrt{c_1 \rho} h X_1 + \tilde{W}_1 \quad \text{(Equation 6)}$$

$$\tilde{Z}_2 = \sqrt{c_3 \rho} h X_2 + \sqrt{c_2 \rho} \sum_{i=1}^{M} f_i g_i (b_i \cdot X_1) + \tilde{V}, \quad \text{(Equation 7)}$$

where $\tilde{W}_1$ and $\tilde{V}$ are both Gaussian noise vector composed of zero-mean unit-variance elements.

$$\rho = \frac{P}{N_0}$$

denotes the SNR system and P denotes the total transmit power, $P=P_1+MP_2+P_3$. Finally, $$c_1 = \frac{P_1}{P}, \quad \text{(Equation 8)}$$

$$c_2 = \frac{P_1 P_2}{P(P_1 + MP_2 + N_0)}, \quad \text{(Equation 9)}$$

$$c_3 = \frac{P_3(P_1 + N_0)}{P(P_1 + MP_2 + N_0)}. \quad \text{(Equation 10)}$$

$c_1$, $c_2$ and $c_3$ are all in the interval (0, 1).

By stacking the two received signals $\tilde{Z}_1$ and $\tilde{Z}_2$ into a vector as $R=[\tilde{Z}_1^T \tilde{Z}_2^T]^T$, then from Equations 6 and 7

$$R=\sqrt{\rho}CH+\tilde{N} \qquad \text{(Equation 11)}$$

where the channel H is a vector of length (M+1) given by $$H=[h\ f_1g_1\ \ldots\ f_Mg_M]^T \qquad \text{(Equation 12)}$$

the 2N×(M+1) matrix C is given by $$C = \begin{bmatrix} \sqrt{c_1}\,X_1 & \\ \sqrt{c_3}\,X_2 & \sqrt{c_2}\,\text{diag}(X_1)B \end{bmatrix} \qquad \text{(Equation 13)}$$

with $B=[b_1\ \ldots\ b_M]$ and the noise term $\tilde{N}$ is given by $\tilde{N}=[\tilde{W}_1^T \tilde{V}^T]^T$.

The matrix C in Equation 13 can be viewed as an ST code matrix, where the codeword $X=[X_1^T X_2^T]^T$ is sent over two time slots and M+1 distributed nodes. Specifically, in the first time slot, $X_1$, which is the first half of X, can be sent from the source node. Then, in the second time slot, $X_2$, which is the second half of X, can be sent from the source node while ($X_1 \circ b_i$) is sent from the ith relay node for $i=1, \ldots, M$.

Assume that the channel state information H is perfectly known at the destination node. If the signal vector X is sent over one cooperation frame but the decoder favors a different signal vector $\hat{X}$, then the pairwise error probability (PEP) is given by $$P(C \to \hat{C}|H) = Q\left(\sqrt{\frac{\rho}{2}\|C_\Delta H\|_F^2}\right) \qquad \text{(Equation 14)}$$

where C and $\hat{C}$ are related to X and $\hat{X}$ according to Equation 13, respectively, and $C_\Delta = C - \hat{C}$. Furthermore, $\|\cdot\|_F$ denotes the Frobenius norm and $$Q(x) = \frac{1}{\sqrt{2\pi}} \int_x^\infty e^{-\frac{t^2}{2}} dt.$$

Using the bound $$Q(x) < e^{-\frac{x^2}{2}},$$

$$P(C \to \hat{C}|H) \le \exp\left(-\frac{\rho}{4} H^H C_\Delta^H C_\Delta H\right).$$

H can be rewritten in Equation 12 as $$H=\tilde{f}\tilde{g},$$

where $$\tilde{f} = \text{diag}(1\ \ f_1\ \ \ldots\ \ f_M),$$
$$\tilde{g} = [h\ \ g_1\ \ \ldots\ \ g_M]^T.$$

Consequently, the average PEP is given by $$P(C \to \hat{C}) \le E_{\tilde{f},\tilde{g}}\left[\exp\left(-\frac{\rho}{4}\tilde{g}^H \tilde{f}^H C_\Delta^H C_\Delta \tilde{f}\tilde{g}\right)\right] \qquad \text{(Equation 15)}$$

where $E_t[\cdot]$ denotes the expectation operation over the random variable t. Note that the elements of $\tilde{g}$ are independent and identically distributed (i.i.d.) with a complex Gaussian distribution. By taking the average of Equation 15 over random variables $\tilde{g}$, $$P(C \to \hat{C}) \le E_{\tilde{f}}\left[\frac{1}{\det\left(I_{M+1} + \frac{\rho}{4}\tilde{f}^H C_\Delta^H C_\Delta \tilde{f}\right)}\right] =$$

$$\left(1 + \frac{\rho}{4}\lambda_1\right)^{-1} E_{\tilde{f}}\left[\frac{1}{\prod_{j=2}^{r}\left(1 + \frac{\rho}{4}\lambda_j|f_{j-1}|^2\right)}\right]$$

where r and $\lambda_j$ denote the rank and the jth eigenvalue of the Hermitian matrix $C_\Delta^H C_\Delta$, respectively. Since $|f_{j-1}|^2$, $\forall j$ are i.i.d. with an exponential distribution and that $$\int_0^\infty (1+ax)^{-1} e^{-x} dx < \frac{2\log(a)}{a}$$

when a is large, it follows that $$P(C \to \hat{C}) < \tilde{c}\frac{1}{\rho}\left(\frac{\log\rho}{\rho}\right)^{r-1} \prod_{j=1}^{r} \frac{1}{\lambda_j} \qquad \text{(Equation 16)}$$

$$\Box \tilde{c}\rho^{-r}\prod_{j=1}^{r}\frac{1}{\lambda_j}, \text{ as } \rho \to \infty$$

where $\tilde{c}=2^{3r-1}$. Therefore, the code design criteria for the half-duplex NAF cooperative channels are as follows:

Rank Criterion: Maximize the diversity gain $$r=\text{rank}(C-\hat{C}) \qquad \text{(Equation 17)}$$

over all pairs of distinct codewords C and $\hat{C}$.

Product Criterion: Maximize the coding gain $$\prod_{j=1}^{r}\lambda_j \qquad \text{(Equation 18)}$$

over all pairs of distinct codewords C and $\hat{C}$.

Because C in Equation 13 is a matrix of size 2N×(M+1), its rank is at most min(2N, M+1). If the length of the codeword X is larger than M+1, then the achievable maximum diversity gain of the cooperative scheme is M+1 as shown in Equation 17.

In order to achieve the full diversity, the distributed ST code C can be designed as follows.

Theorem 1: For the distributed ST code matrix C in (13), if X and B satisfy the following conditions:

Condition 1. The length-2N column vector (X−$\hat{X}$) has no zero entries for any pair of distinct information vectors S and $\hat{S}$; and Condition 2. B has full rank, then the distributed ST code C can achieve a diversity gain of min(N, M)+1. If N≧M, the full diversity of M+1 is achieved.

Proof. By substituting Conditions 1 and 2 into Equation 13, the matrix $C-\hat{C}$ achieves the full rank of 1+min(M, N). Based on Equation 17, the full diversity gain is achieved. For N≧M, the maximum diversity gain is M+1.

Next, an explicit design of full-rate full-diversity distributed ST codes that can satisfy Conditions 1 and 2 is provided. The vector X is designed as follows:

$$X = \Theta S \quad \text{(Equation 19)}$$

where S is a block of 2N independent information symbols, which are selected from QAM, and $\Theta$ is a 2N×2N matrix. $N=2^{\lceil log_2 M \rceil}$ is chosen where $\lceil x \rceil$ denotes the ceiling operation of x and represents the smallest integer that is larger than x. If N≧M and N is a power of 2, then the design of $\Theta$ is given by $$\Theta = F_{2N}^H \text{diag}(1\ \theta \ldots \theta^{2N-1}), \quad \text{(Equation 20)}$$

where $F_{2N}$ is a 2N×2N Discreate Fourier Transform (DFT) matrix and $\theta = e^{j2\pi/(8N)}$. One property of the design of $\Theta$ is that there exist no zero entries in the length-2N vector $(X-\hat{X})$ in Equation 19 for any non-zero vector $(S-\hat{S})$. This is referred to signal space diversity or modulation diversity.

The matrix B is designed as $$B = G \quad \text{(Equation 21)}$$

where G can be any N×M matrix with full rank, such as a submatrix of a Hadamard or DFT matrix of size N×N where $N=2^{\lceil log_2 M \rceil}$.

Note that the design of X in Equation 19 and B in Equation 21 can satisfy Conditions 1 and 2 in Theorem 1. Hence, a diversity gain of min(N,M)+1 is achieved. For instance, if $N=2^{\lceil log_2 M \rceil} \geq M$, then a diversity gain of M+1 is achieved.

The total number of 2N independent information symbols S are encoded into X and then sent via relay nodes to the destination node in 2N symbol intervals. Therefore, full-rate 1 is achieved irrespective of the value of N.

Based on Equation 13, Equation 11 can be rewritten as $$R = \sqrt{\rho} \begin{bmatrix} \sqrt{c_1}\ X_1 h \\ \sqrt{c_3}\ X_2 h + \sqrt{c_2}\ \text{diag}(X_1) \sum_{i=1}^{M} b_i f_i g_i \end{bmatrix} + \tilde{N}.$$

Denote $\Psi = \sum_{i=1}^{M} b_i f_i g_i$. Using Equation 19, Let $$R = \sqrt{\rho} \begin{bmatrix} \sqrt{c_1}\ hI_N \\ \sqrt{c_2}\ \text{diag}(\Psi) & \sqrt{c_3}\ hI_N \end{bmatrix} \Theta S + \tilde{N}. \quad \text{(Equation 22)}$$

$$\Upsilon = \sqrt{\rho} \begin{bmatrix} \sqrt{c_1}\ hI_N \\ \sqrt{c_2}\ \text{diag}(\Psi) & \sqrt{c_3}\ hI_N \end{bmatrix} \Theta.$$

Then, Equation 22 is equivalent to $$\begin{bmatrix} \Re(R) \\ \Im(R) \end{bmatrix} = \begin{bmatrix} \Re(\Upsilon) & -\Im(\Upsilon) \\ \Im(\Upsilon) & \Re(\Upsilon) \end{bmatrix} \begin{bmatrix} \Re(S) \\ \Im(S) \end{bmatrix} + \begin{bmatrix} \Re(\tilde{N}) \\ \Im(\tilde{N}) \end{bmatrix},$$

where $\Re(\cdot)$ and $\Im(\cdot)$ denote the real part and imaginary part, respectively. The received signal vector is now a linear transform of the input signal vector S which is comprised of QAM symbols. If all of the channels are perfectly known at the destination node, then a sphere decoder can be used to implement maximum likelihood (ML) decoding efficiently.

It can be seen from Equation 13 that if the design of X is fixed, the rank of C would not be changed for any nonzero $c_1$, $c_2$ and $c_3$. Thus, the diversity gain will not be changed for any power allocation scheme $\{P_1, P_2, P_3\}$ However, the determinant of $C_A^H C_A$ will be varied for different power allocations. From Equation 18, the maximum determinant of $C_A^H C_A$ is desired. Next, an optimal power allocation scheme under the total power constraint P satisfies the Product Criterion.

Let $$\zeta = \frac{c_1}{c_3},$$

then Equation 13 can be rewritten as $$C = D \begin{bmatrix} \sqrt{c_3} & \\ & \sqrt{c_2}\ I_M \end{bmatrix}, \quad \text{(Equation 23)}$$

where $$D = \begin{bmatrix} \sqrt{\zeta}\ X_1 & \\ X_2 & \text{diag}(X_1) B \end{bmatrix}. \quad \text{(Equation 24)}$$

Let $D_\Delta = D - \hat{D}$, where $\hat{D}$ has the same form as D but is related to $\hat{X}$. Using the code design X and B in, $D_\Delta^H D_\Delta$ has full rank. Let $\sigma_j$ denote the jth eigenvalue of $D_\Delta^H D_\Delta$ for $j=1, \ldots, M+1$. Then, based on Equation 23, $$\det(C_\Delta^H C_\Delta) = \det\left(\begin{bmatrix} \sqrt{c_3} & \\ & \sqrt{c_2}\ I_M \end{bmatrix}^H D_\Delta^H D_\Delta \begin{bmatrix} \sqrt{c_3} & \\ & \sqrt{c_2}\ I_M \end{bmatrix}\right)$$

$$= c_3 c_2^M \prod_{j=1}^{M+1} \sigma_j.$$

Therefore, searching for the optimal power allocation policy to satisfy the Product Criterion is equivalent to the following optimization problem:

$$\text{Maximize } c_3 c_2^M \prod_{j=1}^{M+1} \sigma_j, \forall \{P_1, P_2, P_3\} \quad \text{(Equation 25)}$$

$$\text{subject to } P_1 + M P_2 + P_3 = P,$$

where $c_2$ and $c_3$ are given by Equations 9 and 10, respectively.

The optimal solution to the problem in Equation 25 is intractable because $\prod_{j=1}^{M+1} \sigma_j$ depends on the difference between two codewords X and $\hat{X}$ as well as $\zeta$, and $\hat{X}$ cannot be known at transmitter. However, a suboptimal solution to the problem in Equation 25 can be given as follows.

Theorem 2: Given a total power constraint $P=P_1+MP_2+P_3$ and a fixed $\zeta$, the optimal power allocation scheme $\{P^*_1, P^*_2, P^*_3\}$ for maximizing the coding gain Equation 18 at high SNR, $$\rho\left(\rho = \frac{P}{N_0}\right),$$

is given by $$P_1^* = \frac{1+M}{1+2M}\frac{\zeta}{1+\zeta}P, \quad \text{(Equation 26)}$$

$$P_2^* = \frac{1}{1+2M}\frac{\zeta}{1+\zeta}P, \quad \text{(Equation 27)}$$

$$P_3^* = \frac{1}{1+\zeta}P. \quad \text{(Equation 28)}$$

Proof. For a fixed $\zeta$, $\Pi_{j=1}^{M+1}\sigma_j$ will be independent of any power allocation scheme. Hence, the optimization problem in Equation 25 can be transformed into the following one:

$$\text{Maximize } c_3 c_2^M \prod_{j=1}^{M+1}\sigma_j, \forall \{P_1, P_2, P_3\} \quad \text{(Equation 29)}$$

$$\text{subject to } P_1 + MP_2 + P_3 = P \text{ and } \zeta = \frac{c_1}{c_3}.$$

The total power constraint $P_1+MP_2+P_3=P$ can be rewritten as $$\frac{P_1}{P} + M\frac{P_2}{P} + \frac{P_3}{P} = 1. \quad \text{(Equation 30)}$$

Using Equations 8-10 and $\zeta=c_1/c_3$, $$\frac{P_1}{P} = c_1, \quad \text{(Equation 31)}$$

$$\frac{P_2}{P} = \frac{c_1 + \frac{1}{\rho}}{\frac{c_1}{c_2} - M}, \quad \text{(Equation 32)}$$

$$\frac{P_3}{P} = \frac{1 + \frac{1}{\rho}}{1+\zeta+\frac{\zeta}{c_1\rho}}, \quad \text{(Equation 33)}$$

where again $$\rho = \frac{P}{N_0}.$$

By substituting Equations 31-33 into 30, the optimization problem in Equation 29 can be simplified into $$\text{Maximize } c_1 c_2^M, \forall c_1, c_2 \in (0,1) \quad \text{(Equation 34)}$$

$$\text{subject to } c_1 + \frac{c_1 + \frac{1}{\rho}}{\frac{c_1}{Mc_2} - 1} + \frac{1 + \frac{1}{\rho}}{1+\zeta+\frac{\zeta}{c_1\rho}} = 1$$

for given $\rho$ and $\zeta$. From Equation 34, the optimal values $c^*_1$ and $c^*_2$ can be evaluated. By substituting $c^*_1$ and $c^*_2$ into Equations 31-33, the optimal power allocation $\{P^*_1, P^*_2, P^*_3\}$ are then obtained.

For a high SNR, $\rho$, Equation 34 can be further written as $$\text{Maximize } c_1 c_2^M, \forall c_1, c_2 \in (0,1) \quad \text{(Equation 35)}$$

$$\text{subject to } c_2 = \frac{c_1}{M}\left(1 - c_1\left(1 + \frac{1}{\zeta}\right)\right).$$

The optimal solutions $c^*_1$, $c^*_2$ and $c^*_3$ to the problem in Equation 35 are given by $$c_1^* = \frac{1+M}{1+2M}\frac{\zeta}{1+\zeta}, c_2^* = \frac{c_1^*}{1+2M}, c_3^* = \frac{c_1^*}{\zeta}. \quad \text{(Equation 36)}$$

Therefore, for any given $\zeta$ and P, the optimal power allocation scheme $\{P^*_1, P^*_2, P^*_3\}$ is given by Equations 26-28. In the case of optimal power allocation, observe that $$\frac{P_1^*}{MP_2^*} = 1 + \frac{1}{M}, \quad \text{(Equation 37)}$$

$$\frac{P_3^*}{P} = \frac{1}{1+\zeta}. \quad \text{(Equation 38)}$$

The ratio between the transmit power $P^*_1$ at the source node and the total transmit power $MP^*_2$ at all relay nodes is $$1 + \frac{1}{M}$$

is given in Equation 37. Equation 38 indicates that transmit power $P^*_3$ at the source node in the second time slot consumes only $$\frac{1}{1+\zeta}$$

of the total power P. Then, $\zeta$ can be viewed as the fraction of the total power allocated to $P_3$.

The flat Rayleigh fading channels for all channels, S→R, R→D and S→D, are considered. The source information bits are firstly modulated into 4QAM signals and then precoded with a rotation matrix $\Theta$ into the codeword X of length of 2N, as shown in Equation 19. At each relay node, the received signal is component-wise multiplied with a unique column of B, which is a N×M matrix composed of the first M columns of a Hadamard matrix of size N×N. At the destination node, a sphere decoder is used.

Figure 4:
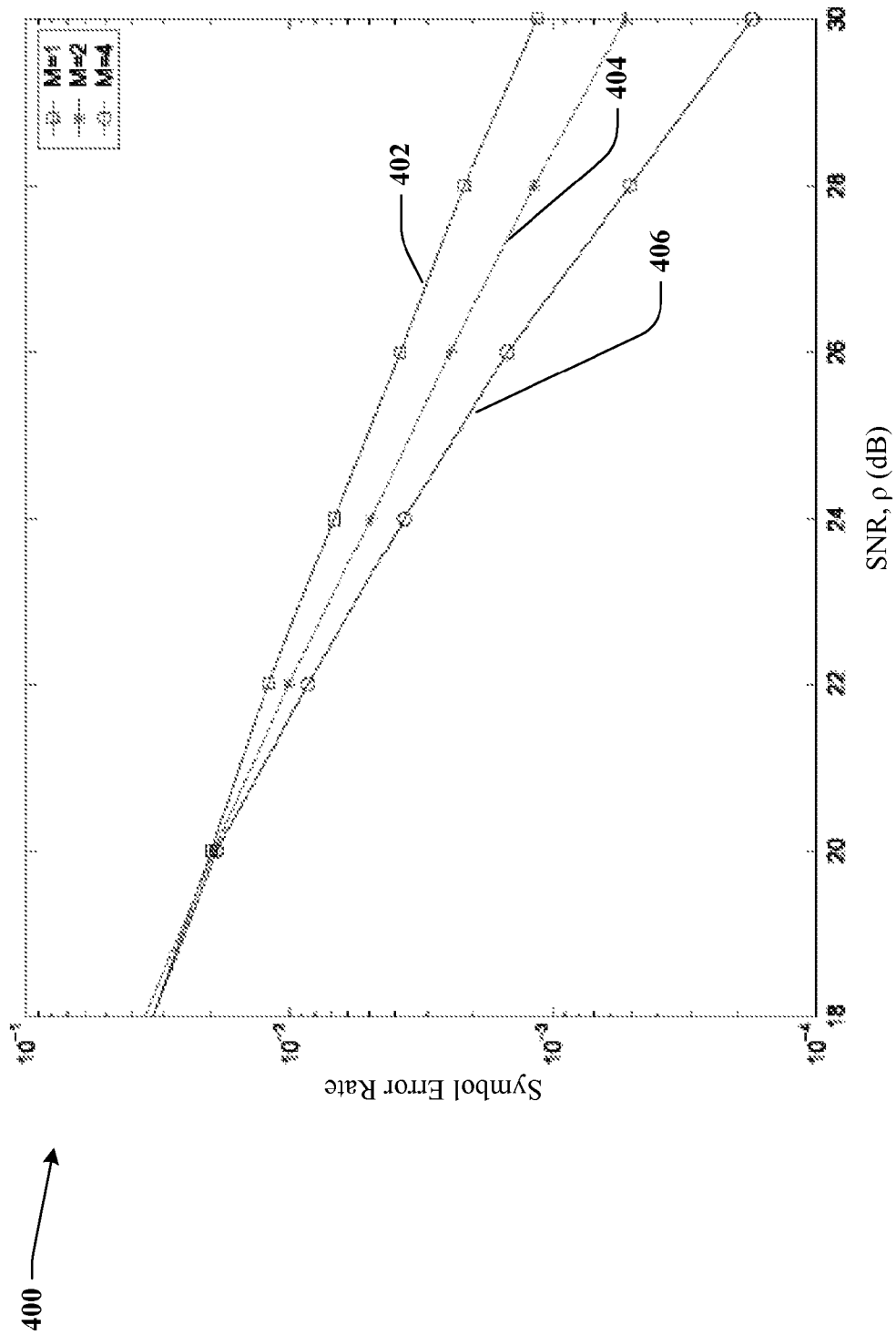
FIG. 4 is a graph of symbol error rate versus signal to noise ration (SNR) in decibels for various numbers of relay nodes.

Referring to FIG. 4, symbol error rate (SER) performance curves of a simulated system according to one aspect is shown with respect to system SNR, $$\rho = \frac{P}{N_0}$$

at $P_3/P=0.5$, (i.e., $\zeta=1$), for one 402, two 404 and four 406 relay nodes, respectively. The optimal power allocation schemes $\{P^*_1, P^*_2, P^*_3\}$ are used for all the simulated cases. From Theorem 2, the optimal power allocation schemes for M=1, 2 and 4 are given by $\left\{\frac{P}{3}, \frac{P}{6}, \frac{P}{2}\right\}, \left\{\frac{3P}{10}, \frac{P}{10}, \frac{P}{2}\right\}$ and $\left\{\frac{5P}{18}, \frac{P}{18}, \frac{P}{2}\right\}$, respectively. FIG. 4 illustrates that performance is improved when the number of relay nodes is increased. In particular, diversity enhancement is increased with an increase in the number of relay nodes.

Figure 5:
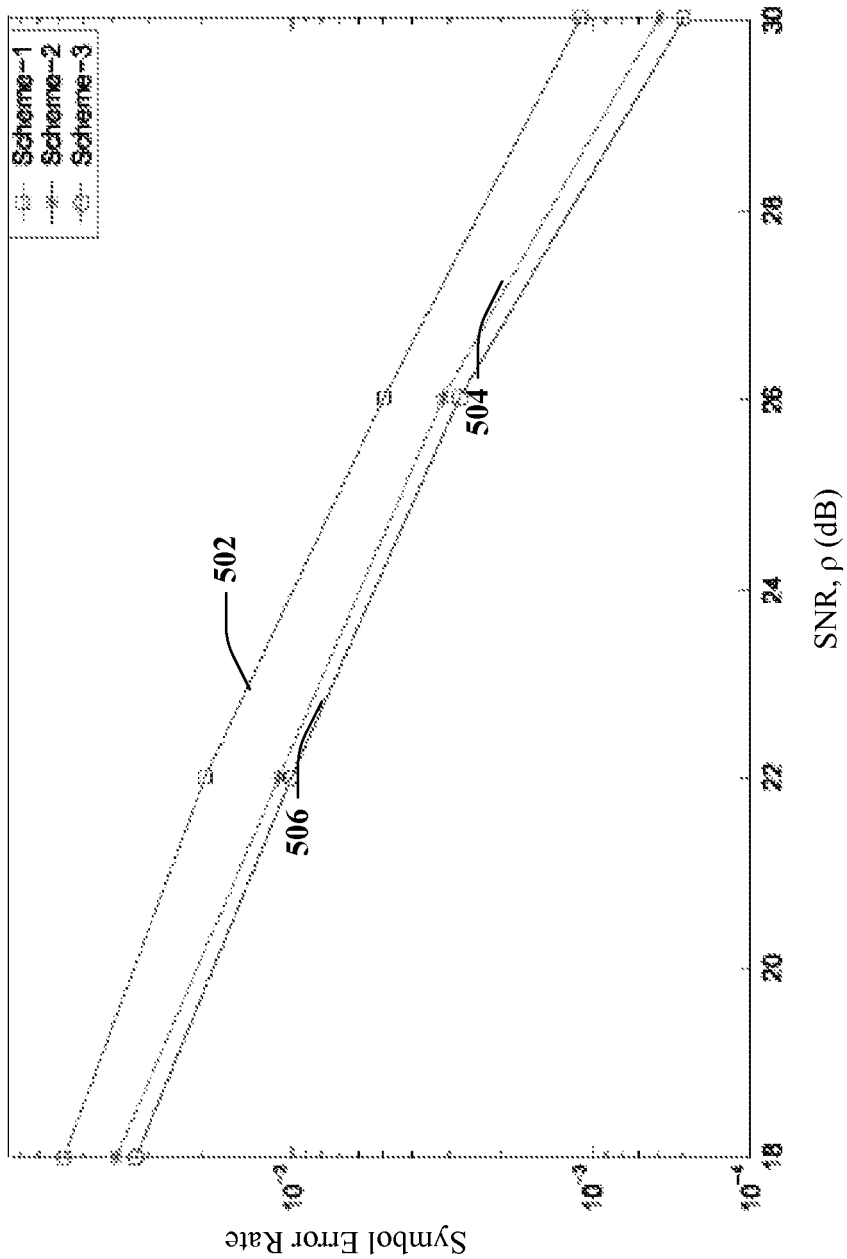
FIG. 5 is a graph of symbol error rate versus SNR for various power allocation schemes.

Referring to FIG. 5, different power allocation schemes are compared for given $P_3/P=0.5$ with two relay nodes. The following three power allocation schemes $\{P_1, P_2, P_3\}$ are used:

Scheme-1: $\left\{\frac{P}{6}, \frac{P}{6}, \frac{P}{2}\right\}$;

Scheme-2: $\left\{\frac{P}{4}, \frac{P}{8}, \frac{P}{2}\right\}$;

Scheme-3: $\left\{\frac{3P}{10}, \frac{P}{10}, \frac{P}{2}\right\}$ (optimal power allocation).

The illustrated graph comprises curves for Scheme 1 502, Scheme 2 504, and Scheme 3 506. Scheme-3 is the optimal power allocation scheme for M=2 and ζ=1. The optimal power allocation scheme gives the best error rate performance. The three simulated curves are shown to have the same slope. This is because different power allocation schemes do not change the diversity gain (the slope of the SER-SNR curve in log-log scale). However, the coding gain can be improved by optimizing power allocation among all the nodes.

Figure 6:
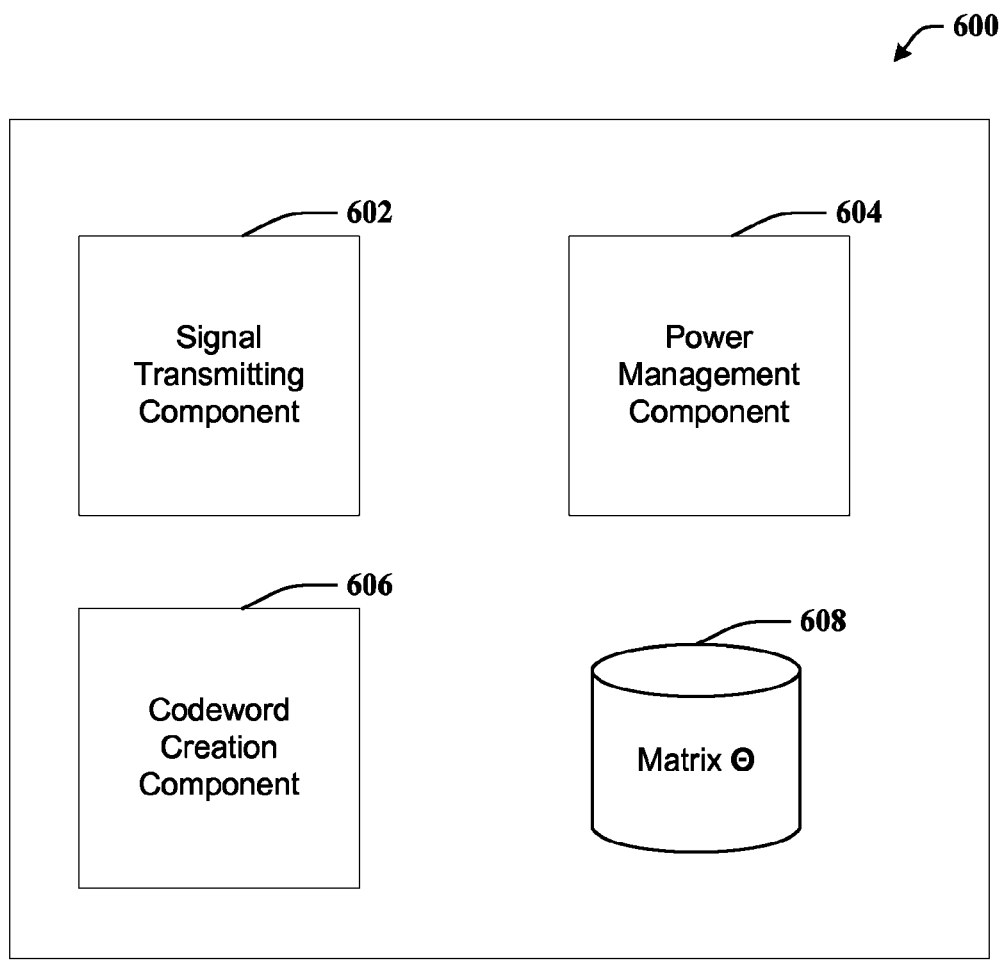
FIG. 6 is a block diagram of a source node in accordance with an aspect of the present invention.
Figure 7:
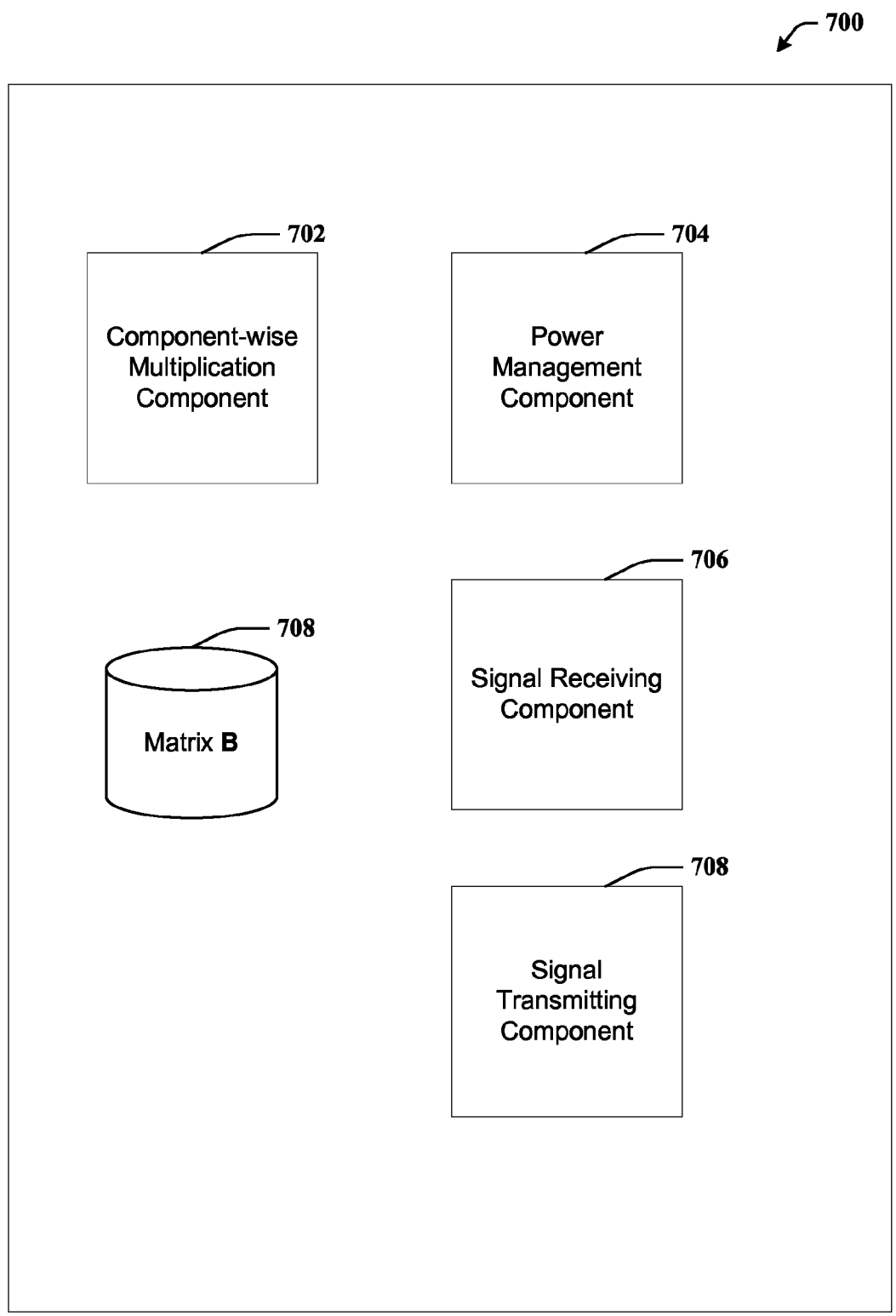
FIG. 7 is a block diagram of a relay node in accordance with an aspect of the present invention.
Figure 8:
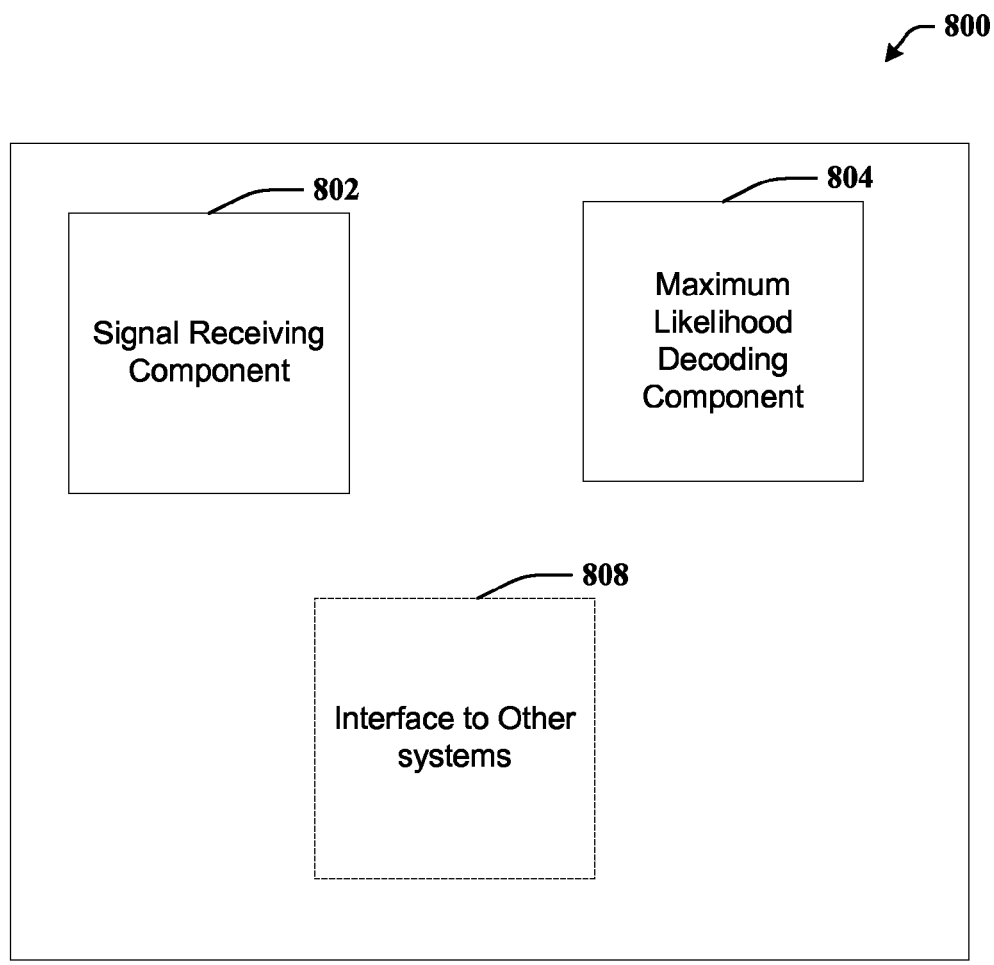
FIG. 8 is a block diagram of a destination node in accordance with an aspect of the present invention.

FIGS. 6-8 illustrate components of each type of node according to one embodiment. Referring to FIG. 6, a system 600 of a source node is illustrated according to one embodiment. A signal transmitting component 602 transmits signals to the relay nodes as well as the destination node. The codeword creation component 606 takes a block of data to be transmitted and determines a codeword to transmit via the signal transmitting component 602. In at least some embodiments, a matrix Θ 608 can be used by the codeword creation component 606, such as by multiplying the block of data with the matrix Θ 608 to determine the keyword. In addition, the power management component 604 determines the optimal power allocation for a transmission and informs the signal transmitting component 602 to transmit at that determined level.

Referring to FIG. 7, a system 700 of a relay node is illustrated according to one embodiment. A signal receiving component 706 receives a signal from the source node. A component-wise multiplication component 702 determines a new data vector to transmit based on a function of that received signal and a signature vector associated with the relay node. Matrix B 708, which is known to all the relay nodes, can be used to determine the signature vector associated with the relay node.

The power management component determines optimal power allocation and amplifies the determined data vector accordingly before transmission by the signal transmitting component 708. Signal transmitting component 708 transmits the amplified signal from the relay node to the destination node simultaneously with the other relay nodes. In at least some embodiments, it also transmits simultaneously with the second portion of the block from the source node.

Referring to FIG. 8, a system 800 of a destination node is illustrated according to one embodiment. A signal receiving component 802 receives signals from one or more relay nodes, as well as the source node. The maximum likelihood decoding component 804 decodes the received signal using maximum likelihood decoding. In one embodiment, this decoding is implemented using a sphere decoder. In at least some embodiments, there is an interface to other systems 806. This interface 806 can receive indications of the decoded data from the maximum likelihood decoding component 804.

Figure 9:
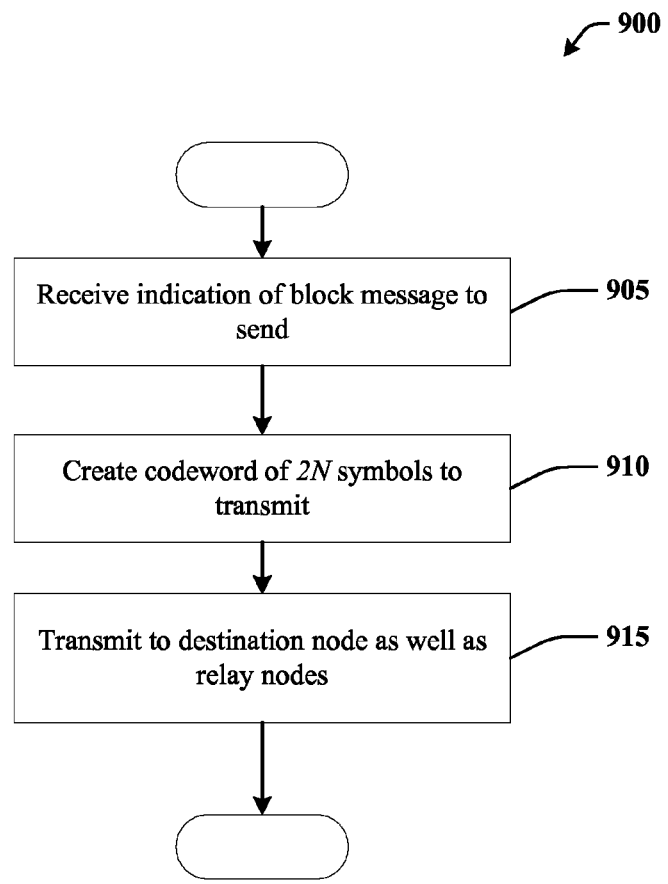
FIG. 9 is a flowchart of a method of a source node in accordance with an aspect of the present invention.
Figure 10:
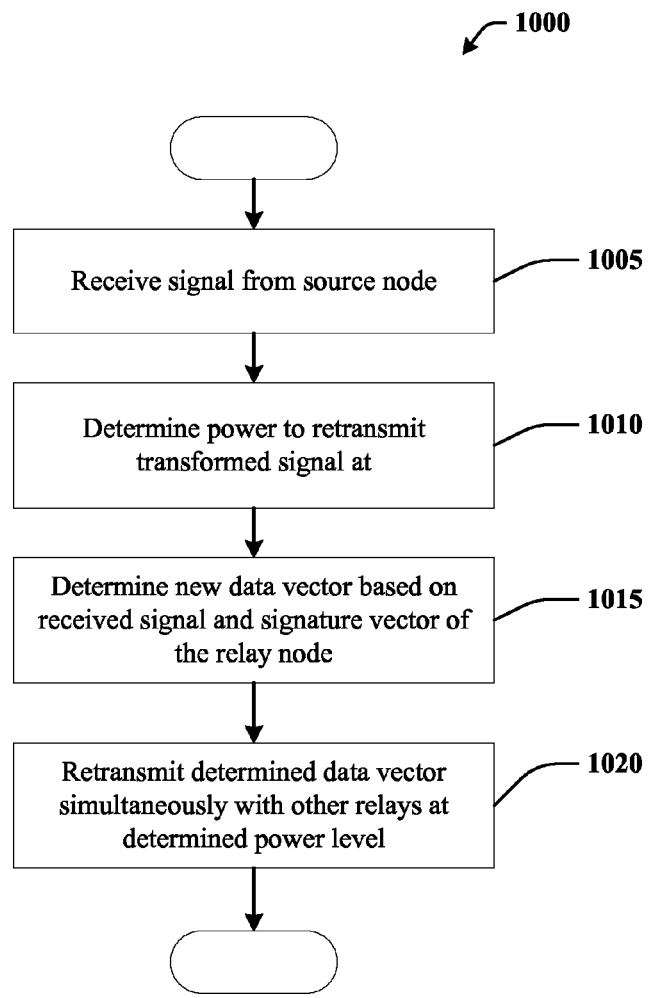
FIG. 10 is a flowchart of a method of a relay node in accordance with an aspect of the present invention.
Figure 11:
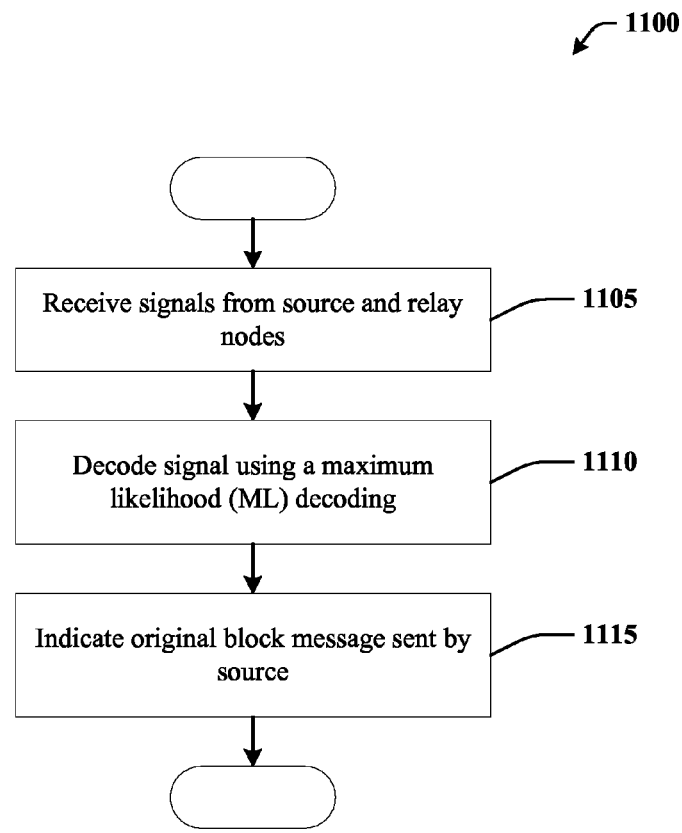
FIG. 11 is a flowchart of a method of a destination node in accordance with an aspect of the present invention.

Turning briefly to FIGS. 9-11, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention. Furthermore, for the sake of clarity, the methods illustrate a transmission of a single portion of block of data; however, one will appreciate that the methods can be performed multiple times to transmit multiple blocks of data.

Referring to FIG. 9, a method 900 of a source node according to one embodiment is illustrated. At 905, an indication of a block message to send is received. At 910, a codeword is created of 2N symbols to transmit. At 915, at least a portion of the codeword is transmitted to the destination node and one or more relay nodes. The other portion, if any, can be transmitted in a consecutive time slot simultaneously with the retransmission of the first part by the relay nodes.

Turning to FIG. 10, a method 1000 of a source node according to one embodiment is illustrated. At 1005, a signal is received from the source node. At 1010, the power level to retransmit the signal at is determined. At 1015, a new data vector is determined based on the power level (e.g., amplifying the signal by a factor), the received signal and a signature vector associated with the relay node. In at least one embodiment, the determination is based at least in part on component-wise multiplication of the received signal with the signature vector. At 1020, the determined data vector is retransmitted simultaneously with the other relays, as well as in at least some embodiments with the second portion of the signal from the source node.

Referring to FIG. 11, a method 1100 of a destination node according to one embodiment is illustrated. At 1105, the destination node receives a signal from the relay nodes and the source nodes. At 1110, the signal is decoded using maximum-likelihood decoding, such as by using a sphere decoder. At 1115, the original block of data (or portion thereof) transmitted by the source is indicated. The indication can be sent to another system or retransmitted to another network (e.g., the Internet) for further processing.

Figure 12:
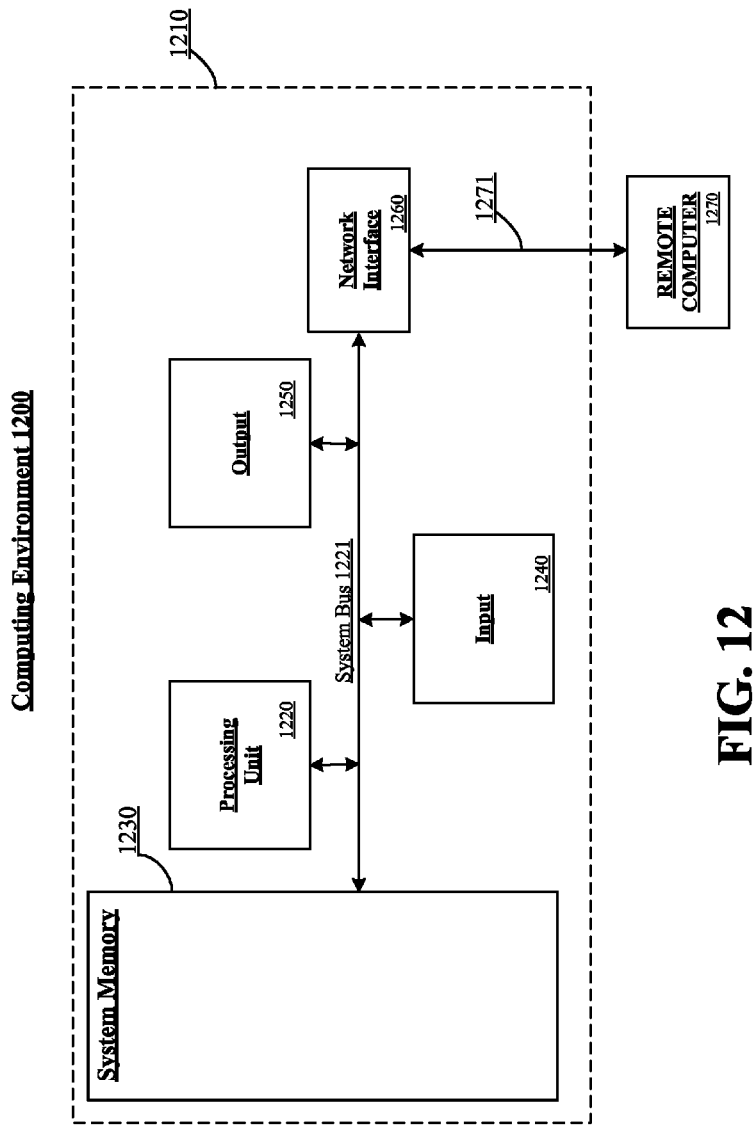
FIG. 12 is a block diagram representing an exemplary non-limiting computing system or operating environment in which the present invention may be implemented.

Turning to FIG. 12, an exemplary non-limiting computing system or operating environment in which the present invention may be implemented is illustrated. One of ordinary skill in the art can appreciate that handheld, portable and other computing devices and computing objects of all kinds are contemplated for use in connection with the present invention, i.e., anywhere that a communications system may be desirably configured. Accordingly, the below general purpose remote computer described below in FIG. 12 is but one example of a computing system in which the present invention may be implemented.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 12 thus illustrates an example of a suitable computing system environment 1200 in which the invention may be implemented but the computing system environment 1200 is only one example of a suitable computing environment for a media device and is not intended to suggest any limitation as to the scope of use or functionality of the invention. Neither should the computing environment 1200 be interpreted as having any dependency or requirement relating to any one or combination of components illustrated in the exemplary operating environment 1200.

With reference to FIG. 12, an example of a remote device for implementing the invention includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210. By way of example, and not limitation, computer readable media may comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules or other data in a modulated data signal such as a carrier wave or other transport mechanism and includes any information delivery media.

The system memory 1230 may include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, may be stored in memory 1230. Memory 1230 typically also contains data and/or program modules that are immediately accessible to and/or presently being operated on by processing unit 1220. By way of example, and not limitation, memory 1230 may also include an operating system, application programs, other program modules, and program data.

The computer 1210 may also include other removable/non-removable, volatile/nonvolatile computer storage media. For example, computer 1210 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221 through a non-removable memory interface such as an interface, and a magnetic disk drive or optical disk drive is typically connected to the system bus 1221 by a removable memory interface, such as an interface.

A user may enter commands and information into the computer 1210 through input devices. Input devices are often connected to the processing unit 1220 through user input 1240 and associated interface(s) that are coupled to the system bus 1221, but may be connected by other interface and bus structures, such as a parallel port, game port or a universal serial bus (USB). A graphics subsystem may also be connected to the system bus 1221. A monitor or other type of display device is also connected to the system bus 1221 via an interface, such as output interface 1250, which may in turn communicate with video memory. In addition to a monitor, computers may also include other peripheral output devices, which may be connected through output interface 1250.

The computer 1210 operates in a networked or distributed environment using logical connections to one or more other remote computers, such as remote computer 1270, which may in turn have media capabilities different from device 1210. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1271, such local area network (LAN) or a wide area network (WAN), but may also include other networks/buses. Such networking environments are commonplace in homes, offices, enterprise-wide computer networks, intranets and the Internet.

When used in a LAN networking environment, the computer 1210 is connected to the LAN 1271 through a network interface or adapter. When used in a WAN networking environment, the computer 1210 typically includes a communications component, such as a modem, or other means for establishing communications over the WAN, such as the Internet. A communications component, such as a modem, which may be internal or external, may be connected to the system bus 1221 via the user input interface of input 1240, or other appropriate mechanism. In a networked environment, program modules depicted relative to the computer 1210, or portions thereof, may be stored in a remote memory storage device. It will be appreciated that the network connections shown and described are exemplary and other means of establishing a communications link between the computers may be used.

The present invention has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the invention described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Furthermore, the invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fu6y logic, data fusion engines, classifiers . . . ). Such components, inter alia, can automate certain mechanisms or processes performed thereby to make portions of the systems and methods more adaptive as well as efficient and intelligent.

Additionally, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A method, comprising:
   receiving, by a system including a processor, an indication of a block of data to send to a destination node;
   creating a codeword to transmit as a function of the indication of the block of data;
   determining a power allocation at which to transmit a first part of the codeword, wherein the power allocation is a function of a number of relay nodes in a network and a transmit power of a source node in the network;
   transmitting the first part of the codeword to the destination node and one or more of the relay nodes during a first time period; and
   transmitting a second part of the codeword to the destination node in a second time period.

2. The method of claim 1, wherein the transmitting the first part of the codeword includes transmitting the first part of the codeword to two or more of the relay nodes.

3. The method of claim 1, wherein the method is performed a plurality of times respectively corresponding to a plurality of indications of blocks of data including the indication of the block of data.

4. The method of claim 1, wherein the transmitting the first part of the codeword includes transmitting approximately half or half of the codeword and the transmitting the second part of the codeword includes transmitting approximately a remaining half or a remaining half of the codeword.

5. The method of claim 1, wherein the creating the codeword to transmit as a function of the indication of the block of data comprises performing a discrete Fourier transform.

6. The method of claim 1, further comprising: performing the transmitting the first part at a determined power allocation.

7. A method, comprising:
   for a relay node of a set of relay nodes,
     receiving, by a system including a processor, a signal from a source node;
     determining a new data vector based, at least, on a signal vector and a signature vector of the relay node, wherein the signature vector is determined based on a function of a total number of relay nodes in the set of relay nodes and the signal vector is modified based on a power scaling factor determined based on a condition that respective average transmit powers of the relay nodes are approximately equal or equal to a same value; and transmitting the new data vector substantially concurrently or concurrently with other ones of the set of relay nodes.

8. The method of claim 7, further comprising: determining a power level at which to transmit the signals, wherein the transmitting the new data vector substantially concurrently or concurrently with the other ones of the set of relay nodes is performed at the power level.

9. The method of claim 7, wherein the transmitting the new data vector substantially concurrently or concurrently with the other ones of the set of relay nodes includes transmitting the new data vector substantially concurrently or concurrently with at least three relay nodes of the set of relay nodes.

10. The method of claim 7, wherein the determining the new data vector based, at least, on the signal vector and the signature vector of the relay node comprises performing component-wise multiplication of the signal vector and the signature vector of the relay node.

11. The method of claim 7, wherein the transmitting the new data vector substantially concurrently or concurrently with the other ones of the set of relay nodes includes transmitting the new data vector substantially concurrently or concurrently with another signal transmission from the source node.

12. A node, comprising:
a codeword creation component configured to generate a codeword to transmit that corresponds to a block of data at the node;
a power management component configured to determine a power allocation at which to transmit a first part of the codeword, wherein the power allocation is a function of a number of relay nodes in a network, and the node is a source node distinct from the relay nodes; and
a signal transmitting component configured to:
transmit the first part of the codeword to a destination node and at least one of the relay nodes in a first time period; and
transmit a second part of the codeword to the destination node during a second time.

13. The node of claim 12, wherein the node being configured to transmit the first part of the codeword comprises the node being configured to transmit approximately half or half of the codeword, and wherein the node being configured to transmit the second part of the codeword comprises the node being configured to transmit approximately a remaining half or a remaining half of the codeword.

14. The node of claim 12, wherein the node being configured to generate the codeword comprises the node being configured to perform a discrete Fourier transform.

15. The node of claim 12, wherein the signal transmitting component is further configured to transmit the first part of the codeword to the destination node and the at least one relay node in the first time period at the power allocation.

16. A node, comprising:
a signal receiving component configured to receive a first signal from a source node, the first signal being associated with a signal vector;
a component-wise multiplication component configured to determine a new data vector based, at least, on the signal vector and a signature vector of the node by performing component-wise multiplication of the signal vector and the signature vector of the node, wherein the signature vector is a function of a number of the plurality of nodes and the signal vector is weighted by a power scaling factor determined to yield an approximately equal or equal average transmit power for the plurality of nodes; and
a signal transmitting component configured to transmit the new data vector.

17. The node of claim 16, further comprising a power management component configured to determine a power level at which to transmit the new data vector, and wherein the signal transmitting component being configured to transmit the new data vector comprises the signal transmitting component being configured to transmit the new data vector at the power level.

18. The node of claim 16, wherein the signal transmitting component being configured to transmit the new data vector comprises the signal transmitting component being configured to transmit the new data vector substantially concurrently or concurrently with a transmission of a second signal from the source node.

19. A node, comprising:
a signal receiving component configured to substantially concurrently or concurrently receive a signal from a source node and a signal from a relay node, wherein the relay node is one of a plurality of relay nodes in a network comprising the relay nodes,
wherein the signal from the relay node comprises an amplified signal, the amplified signal being a function of a first part of a codeword created at the source node, and a signature vector associated with the relay node,
wherein the signature vector is a function of a number of the relay nodes,
wherein the amplified signal is amplified based on a power scaling factor determined to result in average transmit powers of the relay nodes being approximately equal or equal to a same value, and
wherein the signal from the source node comprises a second part of the codeword created at the source node; and
a maximum likelihood decoding component configured to decode the signal from the source node and the signal from the relay node based on maximum likelihood decoding.

20. The node, of claim 19, wherein the maximum likelihood decoding component being configured to decode the signal from the source node and the signal from the relay node comprises the maximum likelihood decoding component being configured to use a sphere decoder to perform the maximum likelihood decoding.

21. An apparatus comprising:
means for receiving a signal from a source node;
means for determining a new data vector based, at least, on a signal vector and a signature vector of the apparatus, wherein the apparatus is one of a plurality of apparatuses in a network comprising the apparatuses, and wherein the signature vector is based on a function of a total number of the plurality of apparatuses, wherein the signal vector is modified as a function of a power scaling factor, and wherein the power scaling factor is determined to set average transmit powers of the plurality of apparatuses approximately equal or equal to a same value; and
means for transmitting the new data vector substantially concurrently or concurrently with other ones of the plurality of apparatuses.

22. A tangible computer-readable medium having instructions stored thereon, the instructions comprising:
    instructions to receive a signal from a source node;
    instructions to determine a new data vector based, at least, on a signal vector and a signature vector of the apparatus, wherein the apparatus is one of a plurality of apparatuses in a network comprising the apparatuses, wherein the signature vector is determined based on a function of a total number of the plurality of apparatuses, and wherein the signal vector is modified based on a power scaling factor determined to result in average transmit powers of the plurality of apparatuses being approximately equal or equal to a same value; and
    instructions to transmit the new data vector substantially concurrently or concurrently with other ones of the plurality of apparatuses.

* * * * *

UNITED STATES PATENT AND TRADEMARK OFFICE
CERTIFICATE OF CORRECTION

PATENT NO. : 8,542,760 B2
APPLICATION NO. : 11/941293
DATED : September 24, 2013
INVENTOR(S) : Zhang et al.

Page 1 of 1

It is certified that error appears in the above-identified patent and that said Letters Patent is hereby corrected as shown below:

In the Specification

In Column 4, Line 24, in Equation (5), delete " $Z_2 = \sqrt{P_3}\, hX_2 + \alpha\sqrt{P_1} \sum_{i=1}^{M} f_i g_i (b_i \cdot X_1) + \tilde{W}_2,$ " and insert -- $\mathbf{Z}_2 = \sqrt{P_3}\, h\mathbf{X}_2 + \alpha\sqrt{P_1} \sum_{i=1}^{M} f_i g_i (\mathbf{b}_i \circ \mathbf{X}_1) + \tilde{\mathbf{W}}_2,$ --, therefor.

In Column 4, Line 44, in Equation (7), delete " $\tilde{Z}_2 = \sqrt{c_3 \rho}\, hX_2 + \sqrt{c_2 \rho} \sum_{i=1}^{M} f_i g_i (b_i \cdot X_1) + \tilde{V},$ " and insert -- $\tilde{\mathbf{Z}}_2 = \sqrt{c_3 \rho}\, h\mathbf{X}_2 + \sqrt{c_2 \rho} \sum_{i=1}^{M} f_i g_i (\mathbf{b}_i \circ \mathbf{X}_1) + \tilde{\mathbf{V}},$ --, therefor.

In Column 9, Line 19, in Equation (29), delete " $\text{Maximize } c_3 c_2^M \prod_{j=1}^{M+1} \sigma_j, \forall \{P_1, P_2, P_3\}$ " and insert -- $\text{Maximize} \quad c_3 c_2^M \quad \forall \{P_1, P_2, P_3\}$ --, therefor.

Signed and Sealed this
Eighteenth Day of March, 2014

Michelle K. Lee
*Deputy Director of the United States Patent and Trademark Office*